United States Patent [19]
Zerweckh

[11] Patent Number: 5,918,832
[45] Date of Patent: Jul. 6, 1999

[54] WING DESIGN USING A HIGH-LIFT CENTER SECTION, AUGMENTED BY ALL-MOVING WING TIPS AND TAILS

[75] Inventor: Siegfried Hermann Zerweckh, Berkley, Calif.

[73] Assignee: General Atomics Aeronautical Systems, Inc., San Diego, Calif.

[21] Appl. No.: 08/818,582

[22] Filed: Mar. 14, 1997

[51] Int. Cl.[6] .................................................. B64C 3/38
[52] U.S. Cl. ........................ 244/48; 244/47; 244/35 R; 244/90 R; 244/120
[58] Field of Search ............................ 244/48, 47, 35 A, 244/35 R, 90 R, 219, 120, 34 R, 34 A

[56] References Cited

U.S. PATENT DOCUMENTS

| | | | |
|---|---|---|---|
| 1,264,152 | 4/1918 | Briggs | 244/39 |
| 1,334,707 | 3/1920 | Martin . | |
| 1,803,498 | 5/1931 | Chilton . | |
| 2,369,832 | 2/1945 | Klose . | |
| 3,901,465 | 8/1975 | De Angelis . | |
| 4,417,708 | 11/1983 | Negri | 244/120 |
| 4,736,910 | 4/1988 | O'Quinn et al. | 244/120 |
| 4,741,497 | 5/1988 | Fox | 244/119 |

FOREIGN PATENT DOCUMENTS

| | | | |
|---|---|---|---|
| 1207944 | 8/1958 | France | 244/90 R |
| 3-7696 | 1/1991 | Japan . | |
| 472845 | 10/1937 | United Kingdom | 244/90 R |

*Primary Examiner*—Charles T. Jordan
*Assistant Examiner*—Tien Dinh
*Attorney, Agent, or Firm*—Nydegger & Associates

[57] ABSTRACT

An air vehicle defining a plane of symmetry includes a pair of outboard panels which are rotatably mounted on the lifting body of the vehicle and respectively extend in opposite directions from the plane of symmetry. A control system collectively rotates the outboard panels to selectively contribute forces from the panels to the lift on the air vehicle. The control system also differentially rotates the outboard panels to control roll of the air vehicle. A pair of empennage panels are also rotatably mounted on the lifting body to establish a dihedral angle centered on the plane of symmetry. The control system collectively rotates these empennage panels to control pitch, and differentially rotates the empennage panels to control yaw, of the air vehicle. In a high speed flight regime the lifting body alone is sufficient and the outboard panels are collectively rotated to reduce drag and contribute substantially zero lift. In a slow speed flight regime, the outboard panels are collectively rotated to contribute to the lift on the air vehicle.

15 Claims, 2 Drawing Sheets

WING DESIGN USING A HIGH-LIFT CENTER SECTION, AUGMENTED BY ALL-MOVING WING TIPS AND TAILS

FIELD OF THE INVENTION

The present invention pertains generally to air vehicles. In particular, the present invention pertains to the wing design for an air vehicle which is convertible between configurations for most efficient lift in either a high speed or a low speed slow flight regime. The present invention is particularly, but not exclusively, useful as airfoils for an unmanned drone air vehicle.

BACKGROUND OF THE INVENTION

According to basic aerodynamic principles, the forces which act on an aircraft in flight are shown in FIG. 1. These forces include lift, weight, thrust and drag. For straight and level unaccelerated flight, thrust is equal in magnitude but opposite in direction to drag, and weight is equal in magnitude and opposite in direction to lift. Maneuver control over an aircraft in flight is obtained by changing the magnitude or direction of these forces, and to thereby cause the aircraft to change its attitude in pitch, roll or yaw. Not surprisingly, any one aspect of attitude control can not be changed without there being some cross effect on another aspect.

Of the forces which act on an aircraft, the factors which affect thrust, lift and drag are to at least some extent controlled by the pilot. The thrust force is simply changed by operation of the aircraft power plant. On the other hand, lift and drag are aerodynamic in nature and are dependent on the particular configuration of the air vehicle and its air foils. While all of the aerodynamic factors are major consideration for aircraft design, a discussion of the lift force is most helpful here. It is well known that the mathematical expression for lift is dependent on several variables and is:

$$L = 1/2 \, \rho S \, V^2 C_l$$

or $$L = 1/2 \, \rho S \, V^2 C_{l\alpha} \alpha$$

Where:

L=Lift $\rho$=air density

S=wing area

V=velocity (speed)

$C_l$=Coefficient of lift for the wing $\alpha$=angle of attack of the wing ( measured from direction of relative wind)

note: $C_{l\alpha}$ is the change in $C_l$ with change in $\alpha$.

From the above expressions, it can be appreciated that the lift force (L) which is generated by an airfoil, or wing, is a function of the airfoil design (S and $C_l$) as well as the conditions of flight ($\rho$, V and $\alpha$). For the moment, consider the effect different velocities (V) have on the aircraft. In order to maintain the required lift, as V changes the $C_l$ must also change. The coefficient of lift ($C_l$), however, involves consideration of wing design. It happens that some wing designs are particularly good for creating lift at relatively high speeds. These same wings, however, may be relatively ineffective at lower speeds. On the other hand, some wing designs are well suited for creating lift at lower speeds but are generally ill suited for generating lift at the higher air speeds. Stated differently, no single wing configuration is optimal for both high speed and low speed flight. Nevertheless, it is clearly desirable that an air vehicle be able to fly with effective control at both high and low speeds.

A very important engineering consideration when determining the flight envelope for an aircraft involves the ability of the craft to transition from high speed flight to low speed flight. One solution to this problem has been to create reconfigurable wings. To this end, several mechanisms have been proposed. These mechanisms include such devices as flaps, slots and slats as well as swing wings. In each case, the device is manipulated by the operator (pilot) to alter the configuration of the wing and thereby change its coefficient of lift ($C_l$). Specifically, as will be appreciated by referring to the lift expressions given above, as the velocity (V) of the aircraft is reduced, an increase in the coefficient of lift ($C_l$) is necessary to maintain the same lift.

Still referring to the expressions for lift which are given above, it will be appreciated that in addition to a reconfiguration of the wing, the requisite lift to keep the aircraft aloft as it slows down can be generated if the angle of attack ($\alpha$) is increased. A change in the angle of attack $\alpha$ for this purpose, however, is good only up to a point. As all pilots know, at a determinable high angle of attack, an airfoil will stall and will no longer create the lift necessary to keep the aircraft flying. Consequently, considerations for angle of attack ($\alpha$) and coefficient of lift ($C_l$) must be made together.

For drone aircraft, not all of the creature comfort considerations involved in piloted aircraft are involved. Nevertheless, the aerodynamic response of the aircraft is still a major concern. Additionally, as a somewhat competing concern, it is desirable with drone aircraft to use as few different component parts as are necessary to create an efficient air vehicle. It is also desirable to create redundancy wherever possible.

In light of the above, it is an object of the present invention to provide an air vehicle having a flight envelope which has a relatively extended range of operational air speeds that includes both high speed flight and low speed flight. It is another object of the present invention to provide an air vehicle which incorporates aerodynamic lifting and control panels, such as wing tips and tail panels, that are interchangeable with each other in order to minimize and simplify maintenance efforts and provide for parts commonality. Yet another object of the present invention is to provide an air vehicle which is reliable and easily controlled. Still another object of the present invention is to provide an air vehicle which is relatively easy to manufacture, operationally easy to control and comparatively cost effective.

SUMMARY OF THE PREFERRED EMBODIMENTS

In accordance with the present invention, an unmanned air vehicle defines a transverse plane of symmetry such that, relative to the plane, one half of the air vehicle is essentially a mirror image of the other half. Using this plane of symmetry as a base reference, the air vehicle has a fuselage which is bisected by the plane of symmetry. The air vehicle also has a left main wing and a right main wing, each of which extend from the plane of symmetry along a respective wing axis. Further, the air vehicle includes an empennage which has a negative dihedral.

Each of the main wings for the unmanned air vehicle includes an inboard panel that is fixedly attached to the fuselage. These inboard panels are designed to be most effective for generating lift at a high lift coefficient. Each main wing also has an outboard panel which is rotatably mounted at the extended end of the inboard panel. The inboard panels are both tapered with a chord length that diminishes with distance from the fuselage and, as mentioned above, each is cambered to efficiently create lift during high speed flight. On the other hand, the outboard panels are substantially symmetrical in their cross section so they can be controlled and oriented to generate zero lift with minimum drag during high speed flight. The outboard panels, however, must be able to effectively generate lift during low speed flight. Thus, across the entire flight regime, the air vehicle has a variable lifting area design.

As indicated above, the air vehicle also has an empennage. This empennage includes a pair of empennage panels, each of which are rotatably attached to the fuselage and inclined relative to the transverse plane of symmetry to establish a negative dihedral. For the present invention, the empennage panels are designed to be aerodynamically the same as the outboard panels. Thus, the empennage panels and the outboard panels are interchangeable.

In flight, the outboard panels of the main wings can be either collectively or differentially controlled. Likewise, the empennage panels can be either collectively or dfferentially controlled. While recognizing that some degree of cross control may be necessary to maintain proper trim for the air vehicle during any particular maneuver, the air vehicle of the present invention is flown in the following manner. Pitch control is accomplished by collectively moving the empennage panels, simultaneously, yaw control is accomplished by dfferentially moving the empannage panels. At the same time, roll control is accomplished by differentially moving the outboard panels on the main wings.

In addition to its control of pitch, yaw and roll, the air vehicle can be selectively reconfigured during flight to optimize its flight characteristics for either a high speed flight regime (80–120 knots) or a low speed flight regime (50–60 knots). Specifically, this selective reconfiguration is done by collectively moving the outboard panels of the main wing.

For high speed flight, as implied above, the outboard panels are collectively moved to a zero angle of attack ($\alpha=0$). Being symmetrical in cross-section, the outboard panels generate zero lift at $\alpha=0$ and their drag is minimized. In this case, the inboard panels effectively act alone to generate the needed lift. On the other hand, for a slow flight regime wherein the inboard panels become relatively inefficient as lifting surfaces, the outboard panels can be collectively rotated to establish an angle of attack and thereby create the additional lift required.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
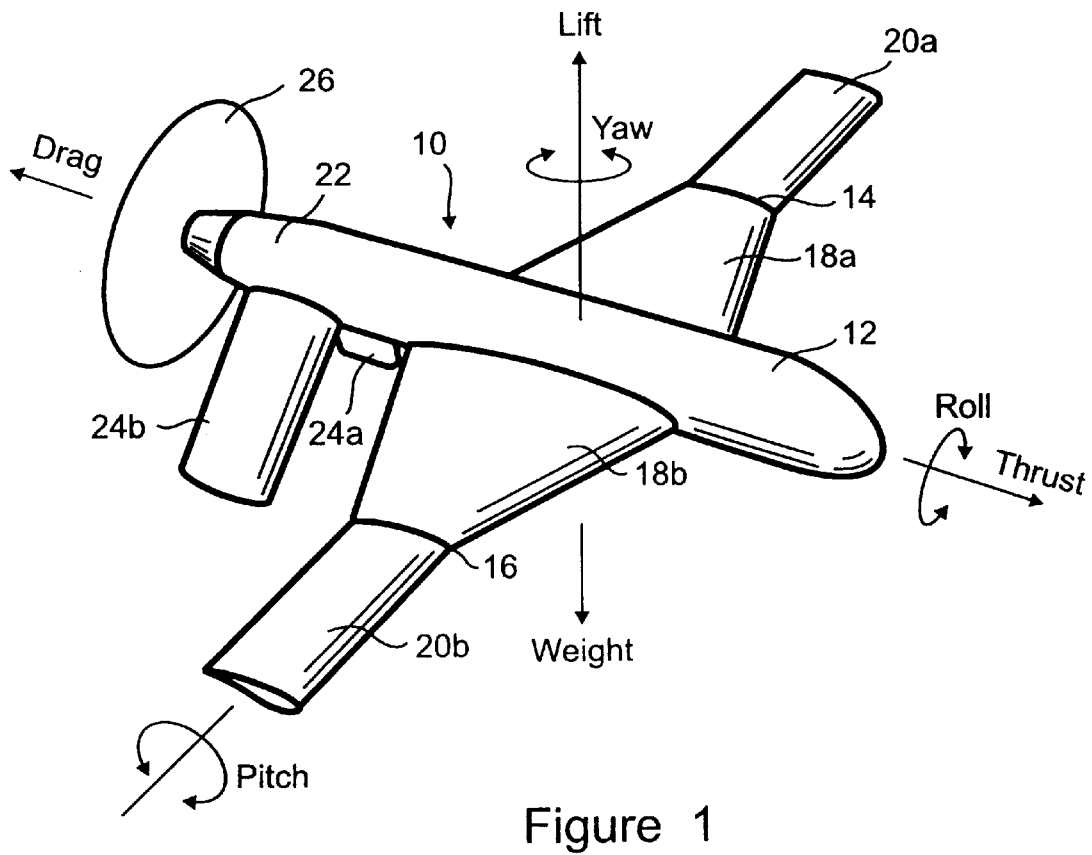
FIG. 1 is a perspective view of the air vehicle of the present invention.

Referring initially to FIG. 1, an unmanned air vehicle in accordance with the present invention is shown, and is generally designated 10. As is easily appreciated by reference to FIG. 1, the air vehicle 10 is generally symmetrical about a transverse plane which is oriented on the vehicle 10 so that the forces of lift, thrust and drag all lie in the plane (also, see FIG. 4). The vehicle 10 is thus bisected by the plane of symmetry in a manner which makes the right half of the vehicle 10 appear to be the mirror image of the left half of the vehicle 10.

FIG. 1 shows that the air vehicle 10 includes a fuselage 12 which can be used to carry a payload (not shown). Also, electronic components (not shown) can be placed in the fuselage 12 and linked in communication with ground based elements (also not shown) for guidance and control purposes.

A left main wing 14 and a right main wing 16 extend from the fuselage 12 and respectively from opposite sides of the plane of symmetry. More specifically, it will be seen that the left main wing 14 includes an inboard panel 18a and an outboard panel 20a. Likewise the right main wing 16 includes an inboard panel 18b and an outboard panel 20b. The main wings 14, 16 define wing axes which are not necessarily colinear. FIG. 1 also shows that the air vehicle 10 has an empennage 22 which includes the empennage panels 24a and 24b. The power plant which provides thrust for air vehicle 10 includes the propeller 26.

Figure 2:
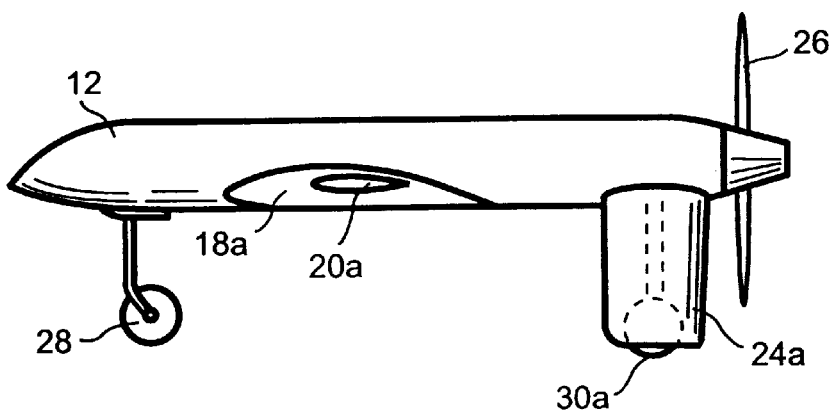
FIG. 2 is a side elevation view of the air vehicle.

From the side view of air vehicle 10 shown in FIG. 2, it can be appreciated that the air vehicle 10 has a tricycle landing gear of a type well known in the pertinent art. As shown, this landing gear includes a nose gear 28 and a main gear 30 (shown partially in phantom). In FIG. 2, only the left main gear wheel 30a is shown.

Figure 3A:
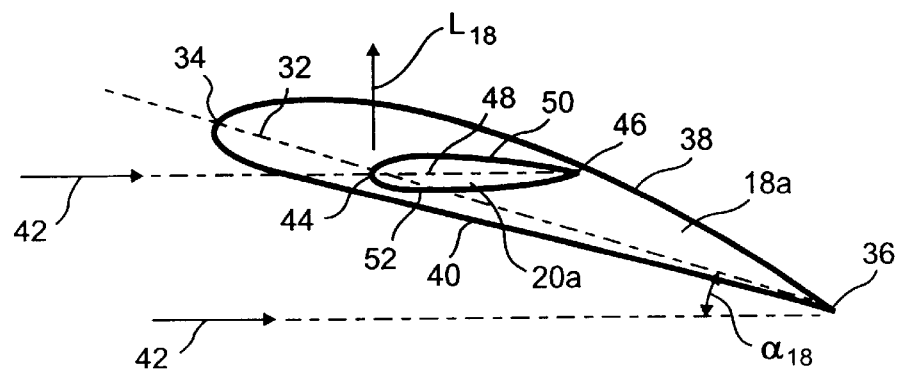
FIG. 3A is a side elevation view of a main wing of the air vehicle configured for high speed flight.
Figure 3B:
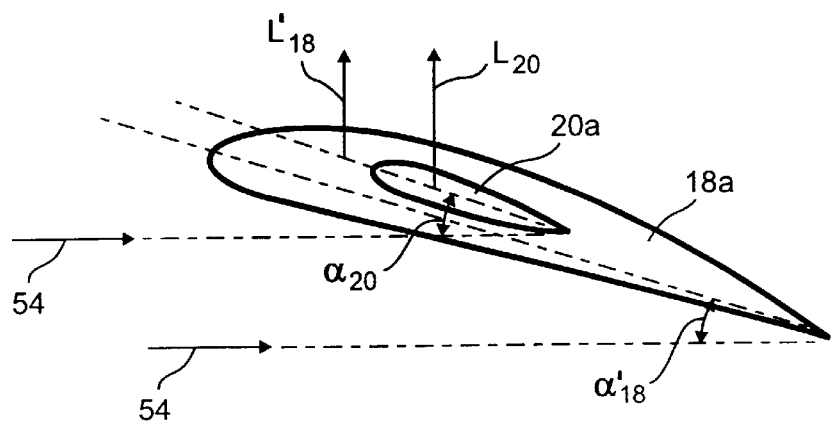
FIG. 3B is a side elevation view of the main wing shown in FIG. 3A configured for slow flight.

FIGS. 3A and 3B respectively show wing configurations for air vehicle 10 that are representative of a high speed flight regime, and of a low speed or slow flight regime. For purposes of the present invention, high speed flight is considered to be cruising flight somewhere in the range of from eighty to one hundred and twenty knots (80–120 kts). Slow flight, on the other hand, is considered to be cruising flight that is somewhere in the range of from fifty to sixty knots (50–60 kts). Slow flight may also be considered as including airspeeds above stall which are encountered during landing and take off maneuvers.

In FIG. 3A it is shown that the inboard panel 18a of main wing 14 defines a chord line 32. Specifically, the chord line 32 extends directly from the front leading edge 34 of the panel 18a to the trailing edge 36 of the panel 18a. Additionally, FIG. 3A shows that the distance along upper surface 38 from front leading edge 34 to trailing edge 36 is greater than the distance along lower surface 40 between these same two points. This difference in distances, and the resultant camber of the surfaces 38 and 40, are important aerodynamic design considerations for inboard panel 18a as it moves through air. For the present invention, the design of inboard panel 18a should be optimized for flight in the relatively high speed flight regime (80–120 kts).

Consider now the wing configuration depicted in FIG. 3A as inboard panel 18a moves through air. In flight, inboard panel 18a moves in a direction and at a speed which creates a relative wind indicated by the arrow 42. To create lift the inboard panel 18 must establish an angle of attack ($\alpha_{18}$) between the relative wind 42 and the chord line 32 of inboard panel 18a. It happens that with an angle of attack $\alpha_{18}$ the air which passes over the upper surface 38 of the air foil (inboard panel 18a) must travel a greater distance than does the air which passes along the lower surface 40. A consequence of this is that the air over upper surface 38 must also move faster than does the air which passes along lower surface 40. According to Bernoulli's principle, the faster moving air creates less pressure on the upper surface 38 than is created on lower surface 40 by the slower moving air that flows under the air foil. This differential in pressure creates a lift force on the airfoil (inboard panel 18a). Specifically, using the expression for lift set forth above, when inboard panel 18a travels with an angle of attack $\alpha_{18}$, at a speed (V) which is determined by relative wind 42, the lift force ($L_{18}$) that is created by panel 18a is expressed as:

$$L_{18} = 1/2 \rho S \ V^2 C_{l\alpha} \alpha_{18}$$

Still referring to FIG. 3A, it will be seen that the outboard panel 20a of the left main wing 14 has a leading edge 44, a trailing edge 46, and a chord line 48 which extends between these two points. Also, it will be seen that the outboard panel 20a has an upper surface 50 and a lower surface 52. However, unlike inboard panel 18a whose upper surface 38 differs from its lower surface 40, the upper surface 50 and lower surface 52 of outboard panel 20a are substantially the same. They both have the same camber and, therefore, the panel 20a is symmetrical. With this configuration, it happens that when the panel 20a is oriented with a zero angle of attack ($\alpha_{20}=0$) into the relative wind 42 (as shown in FIG. 3A), the air moving both above and below the panel 20a travels the same distance, and at the same speed. Consequently, for this flight condition there is no differential in pressure exerted on outboard panel 20a, and no lift is created. There is, of course, a drag force on panel 20a which is preferably minimal. In any event, the aerodynamics of air vehicle 10 are changed considerably whenever the outboard panel 20a is controlled to establish something other than a zero angle of attack ($\alpha$) with the relative wind 42.

In FIG. 3B, a configuration for left main wing 14 is shown as it might be established for slow flight (below 60 kts). For this flight condition, it will be seen that outboard panel 20a has been controlled to establish a positive angle of attack $\alpha_{20}$. Thus, as outboard panel 20a travels with an angle of attack $\alpha_{20}$, at a speed (V) determined by reference to relative wind 54 (e.g. <60 kts), the lift force ($L_{20}$) that is created by panel 20a is expressed as:

$$L_{20} = 1/2 \rho S \ V^2 C_{l\alpha} \alpha_{20}$$

In slow flight, in addition to the lift ($L_{20}$) that is generated by outboard panel 20a, there will still be some, albeit smaller, contribution to lift ($L'_{18}$) from the inboard panel 18a. At high body angles of attack, a thrust component form the propeller generates lift as well. During low speed flight the aircraft operates in a high lift, high drag regime that is augmented by propeller thrust. For straight and level flight, the lift contributions for the high speed flight regime in comparison with the contributions for slow flight yields the relationship:

$$L_{18} = L'_{18} + L_{20}$$

Figure 4:
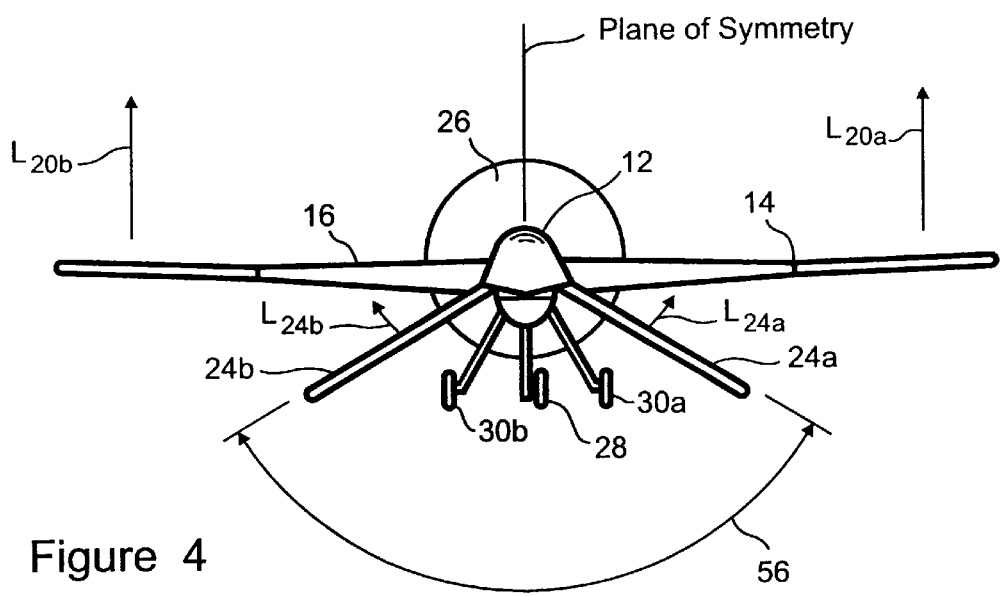
FIG. 4 is a front view of the air vehicle.

With reference to FIG. 4, it is to be appreciated that both the left main wing 14 and the right main wing 16 contribute to the overall lift required for air vehicle 10 to fly. Further, it is to be appreciated that when the outboard panels 20a and 20b are collectively controlled to establish the same angle of attack ($\alpha_{20}$) with the relative wind 54, $L_{20a}$ will equal $L_{20b}$. Note that collective control of outboard panels 20a and 20b can also result in a zero angle of attack for the panels 20a and 20b and, thus, zero lift contribution. As indicated above, however, the outboard panels 20a and 20b can be differentially controlled. Under differential control, the angle of attack for outboard panel 20a ($\alpha_{20a}$) can assume a different value than the angle of attack for outboard panel 20b ($\alpha_{20b}$). If so, the resultant lift ($L_{20a}$) on outboard panel 20a will be different from the resultant lift ($L_{20b}$) on outboard panel 20b. Consequently, with differential control over the outboard panels 20a and 20b, the air vehicle 10 will roll.

Still referring to FIG. 4 it will be seen that the empennage panels 24a and 24b are oriented on fuselage 12 to establish a negative dihedral angle 56. As is well known by persons skilled in the art, this dihedral angle 56 contributes to the stability of air vehicle 10. The dihedral angle 56, however, also provides for control over the air vehicle 10. In accordance with the same aerodynamic principles discussed above in the context of inboard panel 18a and outboard panel 20a, the empennage panels 24a and 24b are also able to generate aerodynamic lift forces. Specifically, these forces are indicated in FIG. 4 as $L_{24a}$ and $L_{24b}$. By collectively varying the respective angles of attack ($\alpha_{24a}$ and $\alpha_{24b}$) of empennage panels 24a and 24b, the pitch of air vehicle 10 can be controlled. On the other hand, control over the yaw of air vehicle 10 can be obtained by differentially varying the respective angles of attack ($\alpha_{24a}$ and $\alpha_{24b}$) of empennage panels 24a and 24b. Recall, outboard panels 20 a, b are interchangeable with empennage panels 24 a, b. Further, all of these panels 20, 24 are interchangeable with each other.

While a more rigorous aerodynamic analysis of the controls for air vehicle 10 would most certainly demonstrate cross-link effects not discussed herein (e.g. the effect of yaw control on roll, as evidenced by the "Dutch Roll Mode"), the above disclosure is intended to demonstrate that a combination of both collective and differential control movements are contemplated for the control surfaces of air vehicle 10. Specifically, air vehicle 10 uses collective and differential control movements on the main wings 14, 16 and on the empennage 22.

OPERATION

A routine flight of the air vehicle 10 begins by placing the air vehicle 10 in a take off configuration. Because take off is accomplished at relatively slow airspeeds (<60 kts), a slow flight configuration for the main wings 14, 16 would be established (see FIG. 3B). In this configuration, both the inboard panels 18a,b and the outboard panels 20a,b are initially oriented to establish an angle of attack $\alpha$, and to thereby generate lift. During the take off roll, the speed of the relative wind 54 increases until the main wings 14,16 are able to generate sufficient lift for air vehicle 10 to fly. As flying speed is attained, the empennage panels 24a,b can be collectively rotated to change the pitch of air vehicle 10. This causes rotation of the air vehicle 10 and lift off.

During climb out, the wing configuration for air vehicle 10 is, most likely, maintained in the slow flight configuration depicted in FIG. 3B. This is done to generate the lift necessary for climb. Once cruise altitude is reached, however, it is desirable for the air vehicle 10 to increase its speed in order for air vehicle 10 to reach its intended destination as soon as possible. Accordingly, the wing configuration of the main wings 14,16 is changed to that shown in FIG. 3A. As mentioned above, this reconfiguration is done by collectively rotating the outboard panels 20a,b to establish a zero angle of attack for these control surfaces. This also reduces the drag that is attributable to the outboard panels 20a,b and, thus, air vehicle 10 is able to fly faster. Recall that as the speed of air vehicle 10 increases into the high speed flight regime (80–120 kts), the inboard panels 18a,b become more efficient as lifting surfaces. Consequently, the inboard panels 18a,b compensate for any loss of lift from the outboard panels 20a,b.

Maneuver of the air vehicle 10 in both slow flight and in the high speed flight regime is accomplished with similar control movements. For turns, the outboard panels 20a,b are differentially controlled. For pitch control, the empennage panels 24a,b are collectively controlled. As will be appreciated by the skilled artisan, various gradations and combinations of these control movements are possible (e.g. climbing turns). Additionally, some differential control over empennage panels 24a,b may be necessary for yaw control.

To descend, the power to propeller 26 is reduced to thereby reduce thrust. Consequently, air vehicle 10 will slow down and begin to loose lift. Again, a collective movement of the empennage panels 24a,b can be made to properly establish the correct pitch attitude for air vehicle 10 during descent. To avoid a stall of the inboard panels 18a,b as the speed of air vehicle 10 is decreased, it will become necessary to again reconfigure the main wings 14,16. This is done by transitioning from the configuration shown in FIG. 3A to the configuration shown in FIG. 3B. After the transition, the outboard panels 20a,b again become effective as lifting surfaces and the air vehicle 10 will be able to fly at slower air speeds.

In order to land air vehicle 10, the air vehicle is flown toward the landing field at a slow speed. On short final into the landing zone, the power is dramatically reduced and the air vehicle 10 is held just above the touchdown surface as its air speed is continually decreasing. At stall, the air vehicle 10 settles onto the ground. Immediately after touchdown, the outboard panels 20a,b and the empennage panels 24a,b can be collectively and simultaneously rotated to create maximum drag, to thereby shorten the after landing roll. In an alternate technique, the outboard panels 20a,b and the empennage panels 24a,b can be collectively and simultaneously rotated to create maximum drag while the air vehicle 10 is still slightly above the landing zone (e.g. 1–2 ft). This will cause the air vehicle 10 to immediately stall and settle onto the landing zone.

While the particular air vehicle as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An air vehicle defining a plane of symmetry and having a fuselage, said air vehicle having a wing comprising:

a pair of inboard panels, each said inboard panel being fixedly attached to said fuselage and extending from the plane of symmetry along a respective wing axis;

a pair of outboard panels, each said outboard panel being mounted on a respective said inboard panel for rotation about said wing axis thereof;

means for collectively rotating said outboard panels to vary lift on said air vehicle;

means for differentially rotating said outboard panels to control roll of said air vehicle;

a first empennage panel rotatable attached to said fuselage;

a second empennage panel rotatable attached to said fuselage opposite said plane of symmetry from said first empennage panel;

means for collectively rotating said first and said second empennage panels to control pitch of said air vehicle;

means for differentially rotating said first and said second empennage panels to control yaw of said air vehicle; and means for interchanging each said empennage panel with each said outboard panel.

2. An air vehicle as recited in claim 1 wherein said inboard panels are cambered to establish a high lift design for said inboard panels.

3. An air vehicle as recited in claim 1 wherein each of said outboard panels have a substantially symmetrical cross section.

4. An air vehicle as recited in claim 1 wherein said inboard panels are tapered with a decreasing chord line in a direction along said wing axis from said fuselage to said respective outboard panel.

5. An air vehicle as recited in claim 1 wherein said empennage is configured to establish a dihedral effect for said air vehicle.

6. A method for flying an air vehicle, said air vehicle defining a plane of symmetry and having a fuselage, and a wing comprising a pair of inboard panels fixedly attached to the fuselage and extending from the plane of symmetry along a respective wing axis with a pair of outboard panels mounted on a respective said inboard panel for rotation about said wing axis thereof, wherein the air vehicle further comprises an empennage having a first empennage panel rotatable attached to the fuselage and a second empennage panel rotatable attached to said fuselage opposite said plane of symmetry from said first empennage panel, and wherein each said empennage panel is interchangeable with said outboard panel, the method comprising the steps of:

collectively rotating said outboard panels to vary lift on said air vehicle;

differentially rotating said outboard panels to control roll of said air vehicle;

collectively rotating said first and said second empennage panels to control pitch of said air vehicle; and differentially rotating said first and said second empennage panels to control yaw of said air vehicle.

7. A method as recited in claim 6 wherein said outboard panels are collectively rotated to create zero lift from said outboard panels for said air vehicle in a high speed flight regime.

8. A method as recited in claim 7 wherein said high speed flight regime is characterized by airspeeds for said air vehicle in a range of from approximately eighty knots to approximately one hundred and twenty knots.

9. A method as recited in claim 6 wherein said outboard panels are collectively rotated to create lift for said air vehicle in a slow speed flight regime.

10. A method as recited in claim 9 wherein said slow speed flight regime is characterized by airspeed for said air vehicle in a range of from approximately fifty knots to approximately sixty knots.

11. A method as recited in claim 6 wherein said outboard panels are collectively rotated to substantially increase drag thereon to stall said air vehicle in a landing regime, said landing regime being characterized by an airspeed for said air vehicle of approximately thirty five knots.

12. An air vehicle defining a plane of symmetry which comprises:

a lifting body for generating a lift force on said air vehicle, said lift force being substantially oriented in said plane of symmetry;

a pair of outboard panels moveably attached to said lifting body, one of said outboard panels being attached to said lifting body opposite said plane of symmetry from said other outboard panel;

a control system for collectively moving said outboard panels to vary the contribution from said outboard panels to the lift on said air vehicle, and for differentially moving said panels to control roll of said air vehicle;

a pair of empennage panels rotatable attached to said lifting body, one of said empennage panels being attached to said lifting body opposite said plane of symmetry from said other empennage panel;

a control system for collectively rotating said empennage panels to control pitch of said air vehicle and for differentially rotating said empennage panels to control yaw of said air vehicle; and means for interchanging each said empennage panel with each said outboard panel.

13. An air vehicle as recited in claim 12 wherein said lifting body comprises:

a fuselage; and a pair of inboard panels, each said inboard panel being fixedly attached to said fuselage and extending from the plane of symmetry along a respective wing axis.

14. An air vehicle as recited in claim 13 wherein said inboard panels are cambered to establish a high lift design for said lifting body and said inboard panels are tapered with a decreasing chord line in a direction along said wing axis away from said fuselage.

15. An air vehicle as recited in claim 13 wherein each said outboard panel is attached to a respective said inboard panel for rotation about said wing axis thereof, said outboard panels being collectively rotatable to create substantially zero lift for said air vehicle in a high speed flight regime, said high speed flight regime being characterized by airspeeds in a range of from approximately eighty knots to approximately one hundred and twenty knots, and collectively rotatable to create substantially equal lift from each said respective outboard panel in a slow speed flight regime, said slow speed flight regime being characterized by airspeeds in a range of from approximately fifty knots to approximately sixty knots.

* * * * *